United States Patent Office 3,057,846
Patented Oct. 9, 1962

3,057,846
METALLIZED DISAZO DYES CONTAINING A MONOCHLOROTRIAZINE SUBSTITUENT
Herbert Francis Andrew and Alec Mee, Manchester, England, assignors to Imperial Chemical Industries Limited, London, England, a corporation of Great Britain
No Drawing. Filed Apr. 14, 1960, Ser. No. 22,089
Claims priority, application Great Britain Apr. 22, 1959
5 Claims. (Cl. 260—146)

This invention relates to new azo dyestuffs and more particularly it relates to new water-soluble azo dyestuffs which are valuable for colouring cellulose textile materials.

According to the invention there are provided the new azo dyestuffs which, in the form of the free acids, are represented by the formula:

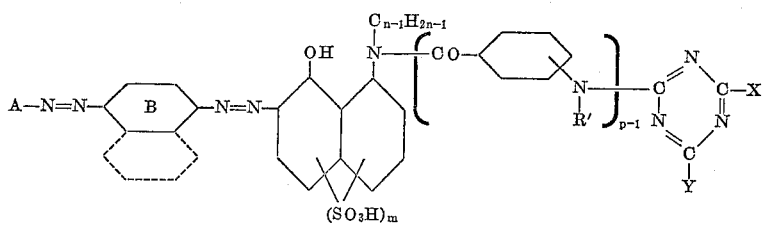

wherein A represents a phenyl or naphthyl radical which may optionally be substituted by halogen atoms or by alkyl or alkoxy radicals containing not more than 4 carbon atoms or by hydroxy, sulphonic or carboxylic acid groups, R' represents a hydrogen atom or an alkyl radical containing not more than 6 carbon atoms, X represents a chlorine or a bromine atom, Y represents an amino group or an aryl, aryloxy or an alkylamino radical or an arylamino, sulphoarylamino or carboxarylamino radical wherein the aryl residue contains not more than 12 carbon atoms, $m$ represents 1 or 2, $n$ represents 1, 2, 3, 4 or 5, $p$ represents 1 or 2 and the phenylene or naphthylene radical B can carry further substituents.

As examples of the alkyl or alkoxy radicals containing not more than 4 carbon atoms which may be present in the phenyl or naphthyl radical represented by A there may be mentioned methyl, ethyl, propyl, butyl, methoxy and ethoxy.

As examples of the alkyl radical containing not more than 6 carbon atoms represented by R' there may be mentioned methyl, ethyl, propyl and butyl.

As examples of the aryl radicals represented by Y there may be mentioned phenyl and tolyl, as an example of the aryloxy radicals represented by Y there may be mentioned phenoxy, as examples of the alkylamino radicals represented by Y there may be mentioned methylamino, dimethylamino and di-($\beta$-hydroxyethyl)amino, as examples of the arylamino radicals represented by Y there may be mentioned naphthylamino, phenylamino and hydroxyphenylamino, as examples of the carboxyarylamino radicals represented by Y there may be mentioned 2-, 3- or 4-carboxyphenylamino and as examples of the sulphoarylamino radicals represented by Y there may be mentioned 2-, 3- or 4-sulphophenylamino, sulphonaphthylamino and 3:5-disulphophenylamino.

As examples of substituents which may be present in the phenylene or naphthylene radical B there may be mentioned sulpho, carboxy, chloro, alkoxy for example methoxy and ethoxy, alkyl for example methyl and ethyl and acylamino for example acetylamino and benzoylamino.

According to a further feature of the invention there is provided a process for the manufacture of the new azo dyestuffs, as hereinbefore defined, which comprises diazotising an amine of the formula:

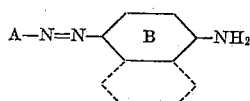

Formula I wherein A and B have the meanings stated above, and coupling the diazo compound so obtained with a coupling component of the formula:

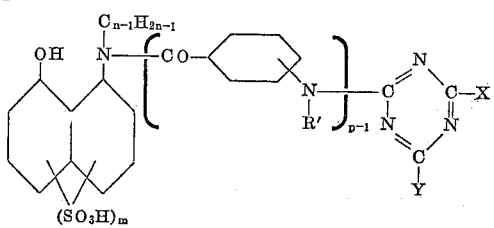

Formula II wherein R', X, Y, $m$, $n$ and $p$ have the meanings stated above.

This process of the invention may be conveniently carried out by adding sodium nitrite to a solution or suspension of the amine of Formula I in a dilute aqueous solution of hydrochloric acid, adding the diazo solution or suspension so obtained to an aqueous solution of the coupling component of Formula II, adding sodium carbonate to maintain the pH of the mixture between 6.5 and 7 and filtering off the azo dyestuff which is precipitated. If desired sodium chloride can be added to ensure complete precipitation of all the azo dyestuff.

The amines of Formula I may themselves be obtained by diazotising a primary amine of the formula: A—NH$_2$, wherein A has the meaning stated above, and coupling the diazo compound so obtained with a para coupling amine of the formula:

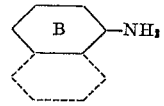

wherein B has the meaning stated above. If desired the para coupling amine may be used in the form of the ω-methane sulphonate; this group being subsequently removed after coupling by treatment with alkali.

As examples of the primary amines of the formula: A—NH₂ which may be used to obtain the amines of Formula I used in this process of the invention there may be mentioned aniline, orthanilic acid, metanilic acid, sulphanilic acid, 5-amino-2-hydroxybenzoic acid, 5-amino-2-hydroxy-3-sulphobenzoic acid, 2-naphthylamine 6- or 8-sulphonic acid, 1-naphthylamine 4-, -5-, -6-, or -7-sulphonic acid, 1-amino-8-naphthol 3:6-disulphonic acid, 2:5-dichloroaniline-4-sulphonic acid, 5-chloro-4-methylaniline-2-sulphonic acid, 4-methoxyaniline-2-sulphonic acid, 3-chloro-4-methylaniline-2-sulphonic acid, 4-chloroaniline-2-sulphonic acid, 4-chloro-3-methylaniline-6-sulphonic acid, 4-chloroaniline-3-sulphonic acid, aniline-2:4-disulphonic acid, aniline-2:5-disulphonic acid, anthranilic acid, 5-sulphoanthranilic acid, 4-sulphoanthranilic acid, 2-methoxy-1-naphthylamine-6-sulphonic acid, 2-ethoxy-1-naphthylamine-6-sulphonic acid, 2-naphthylamine 1:5-, 3:6-, 4:8-, 5:7- or 6:8-disulphonic acid, 2-naphthylamine-1-sulphonic acid, 2-naphthylamine 3:6:8-trisulphonic acid, and 4-sulpho-2-aminoanisole.

As examples of the para coupling amines which may be used to obtain the amines of Formula I used in this process of the invention there may be mentioned 2-methoxy-5-methylaniline, m-toluidine, 2:5-dimethoxyaniline, 1-naphthylamine, 2-methoxy-1-naphthylamine, aniline, anthranilic acid, o-anisidine, 2-methoxy-1-naphthylamine-6-sulphonic acid, 1-naphthylamine-6-sulphonic acid, 1-naphthylamine-7-sulphonic acid, 4-acetylamino-2-aminoanisole, m-aminoacetanilide, 4-benzoylamino-2-aminoanisole, 4-acetylamino-2-aminobenzoic acid, m-chloroaniline, m-anisidine and 2-amino-4-methoxyphenoxyacetic acid.

The coupling components of Formula II may themselves be obtained by treating a naphthol sulphonic acid of the formula:

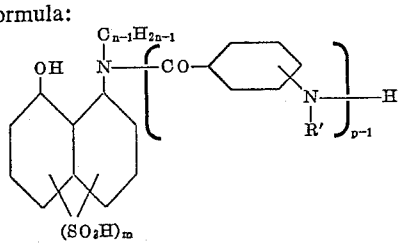

Formula III wherein R′, m, n, and p have the meanings stated above, with a triazine of the formula:

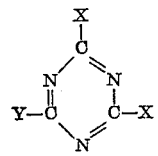

Formula IV wherein X and Y have the meanings stated above.

As examples of the naphthol sulfonic acids of Formula III which may be used to obtain the coupling components of Formula II used in this process of the invention there may be mentioned 1-amino-8-naphthol-3:6-disulphonic acid, 1-(3′- or 4′-aminobenzoylamino)-8-naphthol 3:6-disulphonic acids, 1-N-ethylamino-8-naphthol - 3:6 - disulphonic acid, 1-N-butylamino-8-naphthol-3:6-disulphonic acid, 1-amino-8-naphthol-4:6-disulphonic acid, 1-N-butylamino-8-naphthol-4:6-disulphonic acid, 1-(3′- or 4′-aminobenzylamino)-8-naphthol-4:6-disulphonic acid, 1-amino-8-naphthol-4-sulphonic acid and 1-amino-8-naphthol-3-sulphonic acid.

As examples of the triazines of Formula IV which may be used to obtain the coupling components of Formula II used in this process of the invention there may be mentioned 2-phenyl-4:6-dichloro-1:3:5-triazine, 2-amino-4:6-dichloro-1:3:5-triazine, 2-methylamino-4:6-dichloro-1:3:5-triazine, 2-diethylamino-4:6-dichloro - 1:3:5 - triazine, 2-phenylamino-4:6-dichloro - 1:3:5 - triazine, 2-(2′-sulphophenylamino) - 4:6 - dichloro-1:3:5-triazine, 2-(3′-sulphophenylamino)-4:6-dichloro - 1:3:5 - triazine, 2-(4′-sulphophenylamino) - 4:6 - dichloro-1:3:5-triazine, 2-(2′-carboxyphenylamino)-4:6-dichloro-1:3:5-triazine, 2-(3′-carboxyphenylamino)-4:6-dichloro-1:3:5-triazine, 2-(4′-carboxyphenylamino)-4:6-dichloro-1:3:5-triazine, 2 - (4′-hydroxy-3′ - carboxyphenylamino) - 4:6 - dichloro-1:3:5-triazine, 2-phenoxy-4:6-dichloro-1:3:5-triazine and 2-amino-4:6-dibromo-1:3:5-triazine.

According to a further feature of the invention there is provided an alternative process for the manufacture of the new azo dyestuffs, as hereinbefore defined, which comprises treating an azo compound of the formula:

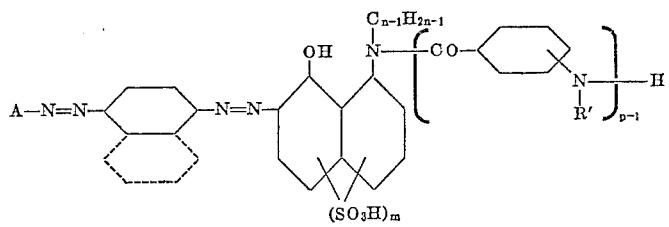

Formula V wherein A, B, R′, m, n, and p have the meanings stated above, with a triazine of Formula IV as hereinbefore defined.

This alternative process of the invention may be conveniently carried out by adding an aqueous solution of the azo compound of Formula V to a solution or suspension of the triazine of Formula IV in water or in a mixture of acetone and water, heating the resulting mixture, preferably at a temperature between 40° and 50° C., adding sodium carbonate to maintain the pH of the mixture between 5 and 7.5, and filtering off the azo dyestuff which is precipitated. If desired, sodium chloride can be added to ensure complete precipitation of all the azo dyestuff.

The azo compounds of Formula V used in this alternative process of the invention may be obtained by coupling a diazotised amine of Formula I, as hereinbefore defined, with a naphthol sulphonic acid of Formula III, as hereinbefore defined.

According to a further feature of the invention there is provided a modified process for the manufacture of the new azo dyestuffs, as hereinbefore defined, wherein Y represents an amino group or an aryloxy, alkylamino radical or an arylamino, carboxyarylamino or sulphoarylamino radical wherein the aryl residue contains not more than 12 carbon atoms, which comprises treating an azo dyestuff of the formula:

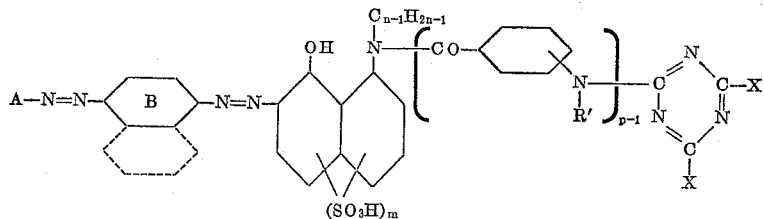

Formula VI wherein A, B, R', X, m, n, and p have the meanings stated above, with a compound of the formula: H.D wherein D represents an amino group or an aryloxy or alkylamino radical or an arylamino, carboxyarylamino or sulphoarylamino radical wherein the aryl residue contains not more than 12 carbon atoms.

This modified process of the invention may be conveniently carried out by heating an aqueous solution of a dyestuff wherein Y represents a halogen atom with one molecular proportion of a compound of the formula: H—D, as hereinbefore defined, at a temperature between 40° and 45° C., adding sodium carbonate to maintain the pH of the mixture between 7.0 and 7.2, adding sodium chloride and filtering off the dyestuff which is precipitated.

As examples of compounds of the formula: H—D which may be used in the modified process of the invention there may be mentioned phenol, ammonia, aniline, 2-sulphoaniline, 3-sulphoaniline, 4-sulphoaniline, 2-carboxyaniline, 3-carboxyaniline, 4-carboxyaniline, 3:5-disulphoaniline, N-methylaniline, 4-hydroxy-3-carboxyaniline, 2-naphthylamine-4:8-, 5:7-, 6:8- or 3:6-disulphonic acid, metanilic acid and 1-naphthylamine-4-sulphonic acid, or the alkali metal salts of these compounds.

The azo dyestuffs of Formula VI may themselves be obtained by treating an azo compound of Formula V with cyanuric chloride or cyanuric bromide.

A preferred class of the new azo dyestuffs, as hereinbefore defined, are those dyestuffs which contain a metallisable group in the phenylene or naphthylene radical represented by B, the said metallisable group being in an ortho position to the azo bond which links B with the naphthalene nucleus, as this preferred class of dyestuffs yield metal complexes which, when applied to cellulose textile materials, give dyeings which have excellent fastness to light.

According to a further feature of the invention there are provided as new metal-containing azo dyestuffs the metal complexes of the azo dyestuffs of the formula:

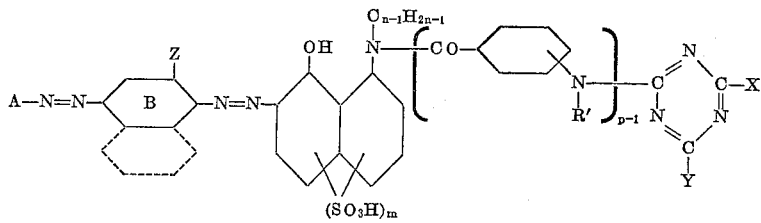

wherein A, B, R', X, Y, m, n, and p have the meanings stated above and Z represents a metallisable group.

As examples of the metallisable groups represented by Z there may be mentioned hydroxy, carboxy, methoxy and carboxyethoxy, and as examples of metals there may be mentioned copper, nickel, cobalt and chromium, and preferably copper.

According to a further feature of the invention there is provided a process for the manufacture of the new metal-containing azo dyestuffs, as hereinbefore defined, which comprises treating an aminoazo compound of the formula:

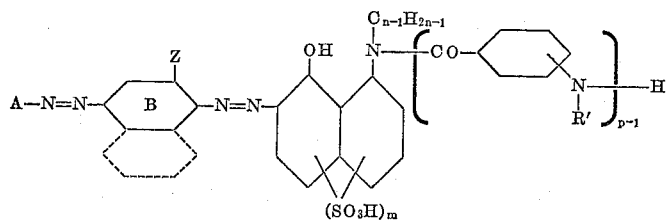

Formula VII wherein A, B, Z, R', m, n and p have the meanings stated above, with a metallising agent and with a triazine of Formula IV, as hereinbefore defined.

The aminoazo compound may be treated with the triazine and then with the metallising agent, but it is preferred to treat the amino azo compound with the metallising agent and subsequently treat the metal complex so obtained with the triazine.

This process of the invention may be conveniently carried out by heating an aqueous solution of the aminoazo compound with an aqueous solution of the metallising agent, adding an aqueous solution of the metal complex so formed to a solution or suspension of the triazine in water or in an aqueous solution of acetone, maintaining the pH of the mixture between 6 and 7 by adding sodium carbonate and filtering off the dyestuff which is precipitated. If desired sodium chloride can be added to ensure complete precipitation of all the dyestuff.

As examples of metallising agents which may be used in the process of the invention here may be mentioned copper sulphate, cuprammonium sulphate, copper acetate, nickel acetate, cobalt sulphate and chromium formate, but the preferred metallising agents are agents which yield copper.

As examples of triazines of Formula IV which may be used in this process of the invention there may be mentioned 2-phenyl-4:6-dichloro-1:3:5-triazine, 2-phenoxy-4:6-dichloro-1:3:5-triazine, 2-amino-4:6-dichloro-1:3:5- triazine, 2-di(β-hydroxyethyl)amino-4:6-dichloro-1:3:5-triazine, 2-phenylamino-4:6-dichloro-1:3:5-triazine, 2-(2'-sulphophenylamino)-4:6-dichloro - 1:3:5 - triazine, 2-(3'-sulphophenylamino) - 4:6 - dichloro-1:3:5-triazine, 2-(4'-sulphophenylamino) - 4:6 - dichloro - 1:3:5 - triazine, 2-amino-4:6-dibromo - 1:3:5 - triazine, 2-methylamino-4:6-dichloro-1:3:5-triazine and 2-dimethylamino-4:6-dichloro-1:3:5-triazine.

The aminoazo compounds of Formula VII used in this process of the invention may be obtained by diazotising a primary amine of the formula: A—NH₂, wherein A has the meaning stated above, coupling the diazo compound so formed with a para coupling amine of the formula:

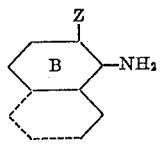

wherein B and Z have the meanings stated above, re-diazotising and coupling under alkaline conditions with a naphthol sulphonic acid of Formula III, as hereinbefore defined.

As examples of primary amines of the formula: A—NH₂ which may be used to obtain the aminoazo compounds used in this process of the invention there may be mentioned aniline, orthanilic acid, metanilic acid, sulphanilic acid, 5-amino-2-hydroxybenzoic acid, 5-amino-2-hydroxy-3-sulphobenzoic acid, 1-naphthylamine 4-, 5-, 6- or 7-sulphonic acid, 2-naphthylamine 6- or 8-sulphonic acid, 2:5-dichloroaniline-4-sulphonic acid, 5-chloro-4-methylaniline-2-sulphonic acid, 4-methoxyaniline-2-sulphonic acid, 3-chloro-4-methylaniline-6-sulphonic acid, 4-chloroaniline-2-sulphonic acid, 4-chloro-3-methylaniline-6-sulphonic acid, 4-chloroaniline-3-sulphonic acid, aniline-2:4-disulphonic acid, aniline-2:5-disulphonic acid, anthranilic acid, 5-sulphoanthranilic acid, 4-sulphoanthranilic acid, 5-nitroanthranilic acid, 2-methoxy-1-naphthylamine-6-sulphonic acid, 2-ethoxy-1-naphthylamine-6-sulphonic acid, 2-naphthylamine-1:5-, 3:6-, 4:8-, 5:7- or 6:8-disulphonic acid, 1-amino-8-naphthol-3:6-disulphonic acid, 2-naphthylamine-1-sulphonic acid and 4-sulpho-2-aminoanisole.

As examples of the para coupling amines which may be used to obtain the aminoazo compounds used in this process of the invention there may be mentioned 2:5-dimethoxyaniline, 2-methoxy-5-methylaniline, anthranilic acid, 2 - methoxy - 1 - naphthylamine-6-sulphonic acid, 2-ethoxy-1-naphthylamine-6-sulphonic acid, o-anisidine, 4-acetylamino-2-aminoanisole, 4 - acetylamino-2-aminobenzoic acid, 4-benzoylamino-2-aminoanisole and 2-amino-4-methoxyphenoxyacetic acid.

As examples of the naphthol sulphonic acids of Formula III which may be used to obtain the aminoazo compounds used in this process of the invention there may be mentioned 1 - amino - 8 - naphthol-3:6-disulphonic acid, 1-(3'- or 4'-aminobenzoylamino)-8-naphthol - 3:6 - disulphonic acid, 1-N-ethylamino-8-naphthol-3:6-disulphonic acid, 1-N-butylamino-8-naphthol - 3:6 - disulphonic acid, 1-amino-8-naphthol-4:6-disulphonic acid, 1-(3'- or 4'-aminobenzoylamino) - 8- naphthol - 4:6-disulphonic acid, 1 - N - butylamino - 8 - naphthol-4:6-disulphonic acid, 1-amino-8-naphthol-4-sulphonic acid and 1-amino-8-naphthol-3-sulphonic acid.

According to a further feature of the invention there is provided a modified process for the manufacture of the new metal-containing azo dyestuffs, as hereinbefore defined, wherein Y represents an amino group or an aryloxy or alkylamino radical or an arylamino, carboxyarylamino or sulphoarylamino radical wherein the aryl residue contains not more than 12 carbon atoms, which comprises treating a metal complex of an azo dyestuff of the formula:

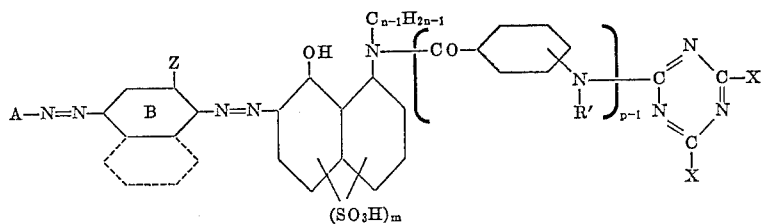

Formula VIII wherein A, B, R', X, Z, m, n, and p have the meanings stated above, with a compound of the formula: DH as hereinbefore defined.

This modified process of the invention may be conveniently carried out by heating an aqueous solution of the metal complex of an azo dyestuff of Formula VIII with one molecular proportion of a compound of the formula: D—H, as hereinbefore defined, at a temperature between 40° and 50° C. adding sodium carbonate to maintain the pH of the mixture between 7.0 and 7.2, adding sodium chloride and filtering off the dyestuff which is precipitated.

The metal complex of an azo dyestuff of Formula VIII may be obtained by treating an aminoazo compound of Formula VII with a metallising agent and then with cyanuric chloride or cyanuric bromide.

The new azo dyestuffs and new metal-containing azo dyestuffs, as hereinbefore defined, are valuable for colouring cellulose textile materials, for example cotton, viscose rayon and linen textile materials. For colouring the cellulose textile materials the new dyestuffs may be applied by either a dyeing or a printing method, preferably in conjunction with a treatment with an acid-binding agent, for example by the methods disclosed in British specification No. 797,946. When so applied to cellulose textile materials the new dyestuffs, as hereinbefore defined, yield reddish-blue to greenish-blue shades possessing excellent fastness to wet treatments such as washing and to light.

A preferred class of the new dyestuffs of the invention are the copper complexes of the azo dyestuffs which, in the form of the free acids, are represented by the formula:

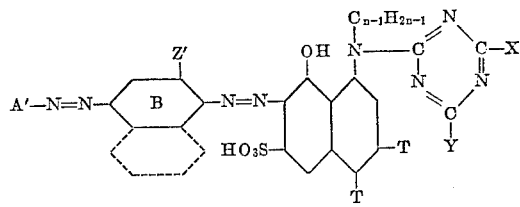

wherein B, X, Y and n have the meanings stated above, A' represents a phenyl or naphthyl radical containing at least one sulphonic acid group, Z' represents a hydroxy or methoxy group, and one T represents a sulphonic acid group and the other T represents a hydrogen atom. In this preferred class X preferably represents a chlorine atom, Y preferably represents a sulphoanilino or disulphoanilino radical and $n$ preferably represents 1.

The invention is illustrated but not limited by the following examples in which the parts and percentages are by weight:

*Example 1*

Diazotised orthanilic acid is coupled with 2-methoxy-5-methylaniline and the aminoazo compound so obtained is diazotised and coupled under alkaline conditions with an equimolecular proportion of 1-amino-8-naphthol-3:6-disulphonic acid. The aminodisazo compound so obtained is converted to the copper complex by heating with an aqueous solution of cuprammonium sulphate for 20 hours at a temperature between 95° and 100° C., adding salt and filtering off the precipitated copper complex.

A solution of 15.1 parts of the above copper complex in 300 parts of water is added with stirring to a suspension of 3.8 parts of 2-amino-4:6-dichloro-1:3:5-triazine in a mixture of 30 parts of acetone and 100 parts of water. The mixture is then stirred for 2 hours at a temperature of 50° C., the pH of the mixture being maintained at 7 by the addition of a 10% aqueous solution of sodium carbonate. 80 parts of sodium chloride are added, the precipitated dyestuff is then filtered off and dried at 30° C. On analysis the dyestuff so obtained is found to contain 1.0 atom of organically bound chlorine for each disazo molecule present.

When applied to cellulose textile materials in conjunction with a treatment with an acid-binding agent the dyestuff yields navy blue shades possessing excellent fastness to washing and to light.

*Example 2*

In place of the 3.8 parts of 2-amino-4:6-dichloro-1:3:5-triazine used in Example 1 there are used 4.7 parts of 2-phenoxy-4:6-dichloro-1:3:5-triazine.

On analysis the dyestuff so obtained is found to contain 0.98 atom of organically bound chlorine for each disazo molecule present.

When applied to cellulose textile materials in conjunction with a treatment with an acid-binding agent the dyestuff yields navy blue shades possessing excellent fastness to washing and to light.

*Example 3*

Diazotised orthanilic acid is coupled with 2-methoxyaniline and the aminoazo compound so obtained is diazotised and coupled under alkaline conditions with an equimolecular proportion of 1-amino-8-naphthol-3:6-disulphonic acid. The aminodisazo compound so obtained is converted to the copper complex by heating with an aqueous solution of cuprammonium sulphate for 20 hours at a temperature between 95° C. and 100° C., adding salt and filtering off the precipitated copper complex.

A solution of 30 parts of the above copper complex in 250 parts of water is added with stirring to a suspension of 7.6 parts of cyanuric chloride in a mixture of 80 parts of acetone, 150 parts of ice and 150 parts of water, the temperature being maintained between 0° and 5° C. by external cooling. The mixture is stirred for 1 hour and 23 parts of a 10% aqueous solution of sodium carbonate are then added. To the solution so obtained is added a solution of 8.1 parts of sodium metanilate in 50 parts of water. 38 parts of a 10% aqueous solution of sodium carbonate are then added and the mixture is heated for 2 hours at a temperature between 40° and 45° C., the pH of the mixture being maintained at 7 by the addition of a 10% aqueous solution of sodium carbonate. 55 parts of sodium chloride are added and the dyestuff, which is precipitated, is filtered off and dried. On analysis the dyestuff so obtained is found to contain 1.1 atoms of organically bound chlorine for each disazo molecule present.

When applied to cellulose textile materials in conjunction with a treatment with an acid-binding agent the dyestuff gives navy blue shades possessing excellent fastness to washing and to light.

*Example 4*

Diazotised 2-naphthylamine 4:8-disulphonic acid is coupled with 2-methoxyaniline and the aminoazo compound so obtained is diazotised and coupled under alkaline conditions with an equimolecular proportion of 1-amino-8-naphthol 3:6-disulphonic acid. The aminodisazo compound so obtained is heated with an aqueous solution of cuprammonium sulphate for 20 hours at a temperature between 95° and 100° C., salt is then added and the copper complex which is precipitated is filtered off and dried.

A solution of 10 parts of the above copper complex is added with stirring to a suspension of 3.6 parts of 2-(4'-sulphoanilino)-4:6-dichloro-1:3:5-triazine in a mixture of 50 parts of acetone and 150 parts of water. The mixture is then stirred for 2 hours at a temperature of 45–50° C., the pH of the mixture being maintained at 7 by the addition of a 10% aqueous solution of sodium carbonate. 10 parts of sodium chloride are then added and the dyestuff which is precipitated is filtered off and dried. On analysis the dyestuff is found to contain 1.1 atoms of organically bound chlorine for each disazo molecule present.

When applied to cellulose textile materials in conjunction with a treatment with an acid-binding agent the dyestuff yields blue shades possessing excellent fastness to washing and to light.

*Example 5*

In place of the 3.6 parts of 2-(4'-sulphoanilino)-4:6-dichloro-1:3:5-triazine used in Example 4 there are used 3.6 parts of 2-(3'-sulphoanilino)-4:6-dichloro-1:3:5-triazine.

On analysis the dyestuff so obtained is found to contain 0.83 atom of organically bound chlorine for each disazo molecule present.

When applied to cellulose textile materials in conjunction with a treatment with an acid-binding agent the dyestuff yields blue shades possessing excellent fastness to washing and to light.

The following table gives further examples of the shades obtained on cellulose textile materials from the dyestuffs obtained by the method described in Example 3 above by diazotising the amine listed in the second column of the table, coupling with the para coupling amine listed in the third column of the table, rediazotising and coupling with the coupling component listed in the fourth column of the table, treating the resulting disazo compound with a coppering agent, condensing the resulting copper complex with cyanuric chloride and finally reacting with the amino compound listed in the fifth column of the table.

| Ex. | Amine | Para coupling amine | Coupling component | Amino compound | Shade obtained on cellulose textile materials |
|---|---|---|---|---|---|
| 6 | Orthanilic acid | 2-methoxyaniline | 1-amino-8-naphthol 3:6-disulphonic acid. | Sodium sulphanilate | Navy blue. |
| 7 | Metanilic acid | 2-methoxy-5-methylaniline | ___do___ | Sodium metanilate | Blue. |
| 8 | 2-naphthylamine 6:8-disulphonic acid. | 2-methoxyaniline | ___do___ | ___do___ | Dark blue. |
| 9 | Orthanilic acid | 2-methoxy-5-methylaniline | 1-amino-8-naphthol-4:6-disulphonic acid. | ___do___ | Do. |
| 10 | Aniline 2:5-disulphonic acid | ___do___ | 1-amino-8-naphthol 3:6-disulphonic acid. | ___do___ | Blue. |
| 11 | 2-naphthylamine 3:6:8-trisulphonic acid. | ___do___ | ___do___ | Aniline | Do. |
| 12 | Sulphanilic acid | 2-methoxyaniline | ___do___ | Sodium metanilate | Navy blue. |

*Example 13*

Diazotised 2-naphthylamine-4:8-disulphonic acid is coupled with 2:5-dimethoxyaniline and the aminoazo compound so obtained is diazotised and coupled under alkaline conditions with an equimolecular proportion of 1-amino-8-naphthol-3:6-disulphonic acid. The aminodisazo compound so obtained is heated with an aqueous solution of cuprammonium sulphate for 20 hours at a temperature between 95° and 100° C., salt is then added and the copper complex which is precipitated is filtered off and dried.

A solution of 37.3 parts of the above copper complex in 280 parts of water is added with stirring to a suspension of 14 parts of 2-(2′-sulphoanilino)-4:6-dichloro-1:3:5-triazine in a mixture of 50 parts of acetone and 100 parts of water. The mixture is then stirred for 1 hour at a temperature of 45° C., the pH of the mixture being maintained at 7 by the addition of a 10% aqueous sodium carbonate. 60 parts of sodium chloride are then added and the dyestuff, which is precipitated, is filtered off and dried. On analysis the dyestuff is found to contain 0.8 atom of organically bound chlorine for each disazo molecule present.

When applied to cellulose textile materials in conjunction with a treatment with an acid-binding agent the dyestuff yields blue shades possessing excellent fastness to washing and to light.

*Example 14*

Diazotised orthanilic acid is coupled with 2-methoxy-5-methylaniline and the aminoazo compound so obtained is diazotised and coupled under alkaline conditions with an equimolecular proportion of 1-amino-8-naphthol-3:6-disulphonic acid.

A solution of 28.7 parts of the above aminodisazo compound in 250 parts of water is added with stirring to a suspension of 7.6 parts of cyanuric chloride in a mixture of 80 parts of acetone, 150 parts of water and 150 parts of ice, the temperature of the mixture being maintained between 0° and 5° C. by external cooling. The mixture is then stirred for 1 hour and 23 parts of a 10% aqueous solution of sodium carbonate are added. To the solution so obtained is added a solution of 8.1 parts of sodium metanilate in 50 parts of water. 23 parts of a 10% aqueous sodium carbonate solution are then added and the mixture is heated for 2 hours at a temperature between 40° and 45° C., the pH of the mixture being maintained at 7 by the addition of a 10% aqueous solution of sodium carbonate. 55 parts of sodium chloride are then added and the dyestuff which is precipitated, is filtered off and dried. On analysis the dyestuff so obtained is found to contain 1.15 atoms of organically bound chlorine for each disazo molecule present.

When applied to cellulose textile materials in conjunction with a treatment with an acid-binding agent the dyestuff yields navy blue shades possessing excellent fastness to washing and good fastness to light.

*Example 15*

In place of the 8.1 parts of sodium metanilate used in Example 14 there are used 6.4 parts of the sodium salt of p-aminobenzoic acid. On analysis the dyestuff so obtained is found to contain 1.15 atoms of organically bound chlorine for each disazo molecule present.

When applied to cellulose textile materials in conjunction with a treatment with an acid-binding agent the dyestuff yields navy blue shades possessing excellent fastness to washing and good fastness to light.

*Example 16*

In place of the 7.6 parts of cyanuric chloride used in Example 3 there are used 13.1 parts of cyanuric bromide. On analysis, the dyestuff so obtained is found to contain 0.95 atom of organically bound bromine for each disazo molecule present.

When applied to cellulose textile materials in conjunction with a treatment with an acid-binding agent the dyestuff yields blue shades possessing excellent fastness to washing and to light.

*Example 17*

A solution of 20.9 parts of the disodium salt of 1-N-butylamino-8-naphthol-3:6-disulphonic acid in 200 parts of water is added with stirring to a suspension of 9.5 parts of cyanuric chloride in a mixture of 120 parts of acetone, 100 parts of water and 100 parts of ice. The resulting mixture is stirred for 2½ hours at a temperature between 0° and 3° C. and the pH of the mixture is then raised to 7 by the addition of a 10% aqueous solution of sodium carbonate. 4.7 parts of aniline are added and the mixture is stirred for 2 hours at a temperature between 40° and 45° C., the pH being maintained at 7 by the addition of a 10% aqueous solution of sodium carbonate. The solution is then cooled to a temperature between 0° and 10° C., and an aqueous suspension of diazotised 4-amino-2-methyl-5-methoxy-1:1′-azobenzene-2′:5′-disulphonic acid (which is obtained by adding a solution of 22.2 parts of the disodium salt of the above aminoazo compound and 3.8 parts of sodium nitrite in 200 parts of water to a mixture of 24 parts of a concentrated aqueous solution of hydrochloric acid and 200 parts of ice), is then added during 5 minutes while the temperature of the mixture is maintained between 0° and 7° C. Sodium carbonate is then added, during ten minutes, until the pH of the mixture is 7.5 and the mixture is stirred for 3 hours at a temperature between 0° and 5° C. 150 parts of sodium chloride are then added and the dyestuff which is precipitated is filtered off, washed with 15 parts of a 10% aqueous solution of sodium chloride and dried. On analysis the dyestuff so obtained is found to contain 1.1 atoms of organically bound chlorine for each disazo molecule present.

When applied to cellulose textile materials in conjunction with a treatment with an acid-binding agent the dyestuff yields violet shades possessing good fastness to washing and to light.

*Example 18*

In place of the 30 parts of the copper complex used in Example 3 there are used 35.7 parts of the chromium complex which is obtained by coupling diazotised 2-naphthylamine-5:7-disulphonic acid with anthranilic acid in acid medium, diazotising the aminomonoazo compound so obtained, coupling the resulting diazo compound with 1- amino-8-naphthol-3:6-disulphonic acid in alkaline medium and heating the aminodisazo compound so obtained with an aqueous solution of chromium acetate. On analysis the dyestuff so obtained is found to contain 0.85 atom of organically bound chlorine for each disazo molecule present.

When applied to cellulose textile materials in conjunction with a treatment with an acid-binding agent the dyestuff yields violet shades possessing good fastness to washing and to light.

*Example 19*

In place of the 30 parts of the copper complex used in Example 3 there are used 37.0 parts of the nickel complex which is obtained by coupling diazotised 2-naphthylamine-5:7-disulphonic acid with anthranilic acid in acid medium, diazotising the aminomonoazo compound so obtained, coupling the resulting diazo compound with 1-amino-8-naphthol-3:6-disulphonic acid in alkaline medium and heating the aminodisazo compound with an aqueous solution of nickel sulphate. On analysis the dyestuff so obtained is found to contain 1.1 atoms of organically bound chlorine for each disazo molecule present.

When applied to cellulose textile materials in conjunction with a treatment with an acid-binding agent the dyestuff yields violet shades possessing good fastness to washing and to light.

stuff so obtained is found to contain 0.91 atom of organically bound chlorine for each disazo molecule present.

When applied to cellulose textile materials in conjunction with a treatment with an acid-binding agent the dyestuff yields grey shades possessing good fastness to washing and to light.

The following table gives further examples of the shades obtained on cellulose textile materials from the dyestuffs obtained by the method described in Example 3 above by diazotising the amine listed in the second column of the table, coupling with the para coupling amine listed in the third column of the table, rediazotising and coupling with the coupling component listed in the fourth column of the table, treating the resulting disazo compound with a coppering agent, condensing the resulting copper complex with cyanuric chloride and finally reacting with the amino compound listed in the fifth column of the table.

| Ex. | Amine | Para coupling amine | Coupling component | Amino compound | Shade obtained on cellulose textile materials |
|---|---|---|---|---|---|
| 21 | Orthanilic acid | o-Anisidine | 1-amino-8-naphthol-4:6-disulphonic acid | Metanilic acid | Navy-blue. |
| 22 | 2-naphthylamine-6:8-disulphonic acid | do | 1-amino-8-naphthol-3:6-disulphonic acid | Aniline | Do. |
| 23 | 2-naphthylamine-4:8-disulphonic acid | 2-methoxy-5-methylaniline | do | do | Do. |
| 24 | 2-naphthylamine-3:6:8-trisulphonic acid | do | do | p-Aminobenzoic acid | Do. |
| 25 | Orthanilic acid | do | 1-amino-8-naphthol-4:6-disulphonic acid | Sulphanilic acid | Do. |
| 26 | do | 1-amino-6-sulpho-2-naphthoxyacetic acid | 1-amino-8-naphthol-3:6-disulphonic acid | Metanilic acid | Greenish-blue. |

The following table gives further examples of the shades obtained on cellulose textile materials from the dyestuffs obtained by the methods described in Examples 1 and 4 above by diazotising the amine listed in the second column of the table, coupling with the para coupling amine listed in the third column of the table, rediazotising and coupling with the coupling component listed in the fourth column of the table, treating the resulting disazo compound with a coppering agent, and condensing the resulting copper complex with the triazine listed in the fifth column of the table.

| Ex. | Amine | Para coupling amine | Coupling component | Triazine | Shade obtained on cellulose textile materials |
|---|---|---|---|---|---|
| 27 | Orthanilic acid | 2-methoxy-5-methyl aniline | 1-amino-8-naphthol-3:6-disulphonic acid | 2-(3'-sulphoanilino)-4:6-dichloro-1:3:5-triazine | Navy-blue. |
| 28 | do | o-Anisidine | do | 2-(3':5'-disulphoanilino)-4:6-dichloro-1:3:5-triazine | Do. |
| 29 | 2-naphthylamine-4:8-disulphonic acid | 2-methoxy-5-methyl aniline | do | 2-methoxy-4:6-dichloro-1:3:5-triazine | Do. |
| 30 | 3-chloro-4-methylaniline-6-sulphonic acid | do | do | 2-(3':5'-disulphoanilino)-4:6-dichloro-1:3:5-triazine | Do. |
| 31 | 4-aminoanisole-3-sulphonic acid | do | 1-amino-8-naphthol-4:6-disulphonic acid | 2-(3'-sulphoanilino)-4:6-dichloro-1:3:5-triazine | Do. |
| 32 | Aniline-2:5-disulphonic acid | do | 1-(3'-aminobenzoylamino)-8-naphthol-3:6-disulphonic acid | do | Greenish-blue. |

*Example 20*

In place of the 30 parts of the copper complex used in Example 3 there are used 35.8 parts of the cobalt complex which is obtained by coupling diazotised 2-naphthylamine-5:7-disulphonic acid with anthranilic acid in acid medium, diazotising the aminomonoazo compound so obtained, coupling the resulting diazo compound with 1-amino-8-naphthol-3:6-disulphonic acid in alkaline medium, and heating the aminodisazo compound so obtained with an aqueous solution of cobalt acetate. On analysis, the dyestuff so obtained is found to contain 0.91 atom of organically bound chlorine for each disazo molecule present.

The following table gives further examples of the shades obtained on cellulose textile materials from the dyestuffs obtained by the method described in Example 14 by diazotising the amine listed in the second column of the table, coupling with the para coupling amine listed in the third column of the table, rediazotising and coupling with the coupling component listed in the fourth column of the table, condensing the resulting aminodisazo compound with cyanuric chloride and finally reacting with the amino compound listed in the fifth column of the table.

| Ex. | Amine | Para coupling amine | Coupling component | Amino compound | Shade obtained on cellulose textile material |
|---|---|---|---|---|---|
| 33 | Orthanilic acid | 2-methoxy-1-naphthylamine-6-sulphonic acid. | 1-amino-8-naphthol-3:6-disulphonic acid. | Metanilic acid | Blue. |
| 34 | 2-naphthylamine-4:8-disulphonic acid. | 2:5-dimethoxyaniline | do | do | Do. |
| 35 | do | do | do | Sulphanilic | Do. |
| 36 | 2-naphthylamine-3:6:8-trisulphonic acid. | 2-methoxy-5-methylaniline | do | p-Aminobenzoic acid | Do. |
| 37 | Metanilic acid | do | 1-amino-8-naphthol-4:6-disulphonic acid. | Aniline-3:5-disulphonic acid | Do. |
| 38 | do | do | 1-amino-8-naphthol-3:6-disulphonic acid. | Metanilic acid | Do. |
| 39 | 2-aminophenol-4:6-disulphonic acid. | 2:5-dimethoxyaniline | do | do | Greenish-blue. |

What we claim is:

1. A compound selected from the class consisting of azo dyestuffs of the formula:

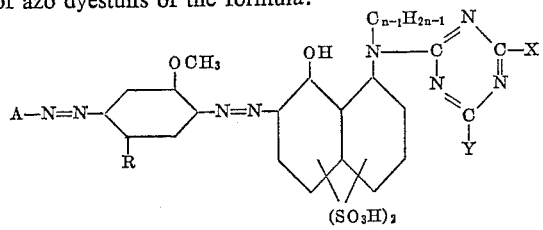

and the 1:1 copper-, 1:1-nickel-, 1:2-chromium and 1:2-cobalt complexes thereof, wherein A represents a member selected from the class consisting of sulfonated phenyl and naphthyl radicals on which any substituents are selected from the class consisting of chlorine, methyl, methoxy and hydroxy;

R is selected from the class consisting of hydrogen, methyl and methoxy;

X represents a member selected from the class consisting of chlorine and bromine atoms;

Y represents a member selected from the class consisting of amino and methoxy, phenoxy and phenylamino on which any substituents are selected from the class consisting of sulfonic acid and carboxylic acid radicals; and, n represents one of the numbers 1, 2, 3, 4 and 5.

2.

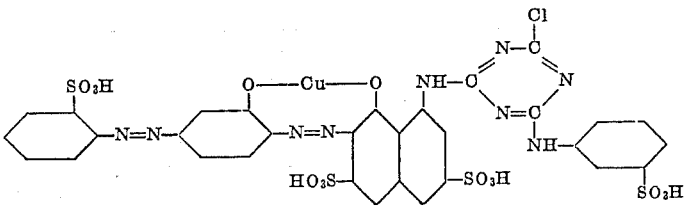

3.

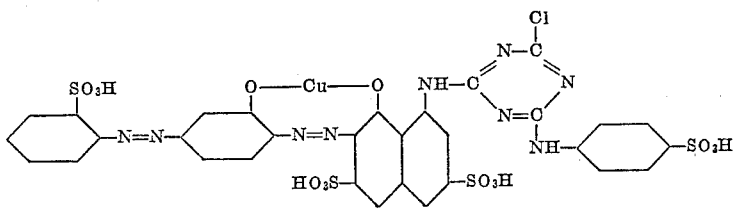

4.

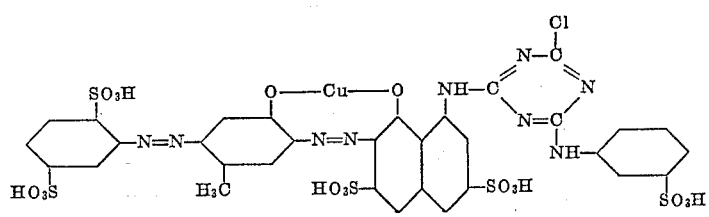

5.

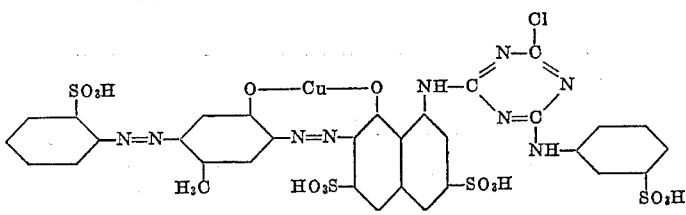

References Cited in the file of this patent

UNITED STATES PATENTS

| 2,396,659 | Kaiser | Mar. 19, 1946 |
| 2,860,128 | Gunst | Nov. 11, 1958 |
| 2,945,021 | Fasciati et al. | July 12, 1960 |